United States Patent [19]

Kaiya et al.

[11] 4,136,088

[45] Jan. 23, 1979

[54] METHOD FOR RECOVERING LOW MOLECULAR WEIGHT POLYMERS

[75] Inventors: Atsushi Kaiya, Kawasaki; Eizo Arai, Yokohama; Hideo Kawaguchi, Kawasaki; Kazuo Miyazaki, Yokohama, all of Japan

[73] Assignee: Nippon Oil Co., Ltd., Tokyo, Japan

[21] Appl. No.: 777,516

[22] Filed: Mar. 14, 1977

[30] Foreign Application Priority Data

Mar. 19, 1976 [JP] Japan .................................. 51-29192

[51] Int. Cl.$^2$ .............................................. C07C 15/00
[52] U.S. Cl. ............................ 260/669 P; 260/680 B; 260/674 SE
[58] Field of Search ......... 260/669 P, 680 B, 674 SE, 260/681.5 R

[56] References Cited

U.S. PATENT DOCUMENTS

| | | | |
|---|---|---|---|
| 2,813,136 | 11/1957 | Mertz | 260/680 B |
| 3,448,160 | 6/1969 | Schleimer | 260/669 P |
| 3,789,090 | 1/1974 | Otsuki et al. | 260/669 P |

Primary Examiner—George Crasanakis
Assistant Examiner—Joseph A. Boska
Attorney, Agent, or Firm—Ostrolenk, Faber, Gerb & Soffen

[57] ABSTRACT

A method for recovering a low molecular weight polymer containing no catalyst residue, which method comprises the steps of: polymerizing a conjugated diolefin or copolymerizing comonomers of conjugated diolefins and a vinyl compound having anionic polymerization activity in the presence of a catalyst containing an organic sodium compound and a chain transfer agent of an alkyl aryl compound; uniformly mixing the obtained polymerization mixture with an isopropyl alcohol aqueous solution; separating the thus obtained mixture into two phases of a polymer mixture containing the liquid low molecular weight polymer and an isopropyl alcohol aqueous solution containing catalyst residue; and separating the low molecular weight polymer from the polymer mixture.

7 Claims, No Drawings

METHOD FOR RECOVERING LOW MOLECULAR WEIGHT POLYMERS

BACKGROUND OF THE INVENTION

(1) Field of the Invention

This invention relates to a method for recovering liquid polymers. More particularly, the invention relates to a method for recovering low molecular weight polymers that contain no catalyst residue, in which conjugated diolefins are polymerized or conjugated diolefins and vinyl compounds having anionic polymerization activity are copolymerized in the presence of a catalyst mainly containing organic sodium compounds, and the obtained liquid polymerization mixture is then uniformly mixed with an aqueous solution of isopropyl alcohol to decompose the catalyst and to transfer catalyst residue into the isopropyl alcohol aqueous solution, thereby separating and recovering the low molecular weight polymers.

Further, in the method of the present invention, liquid low molecular weight polymers of conjugated diolefins are prepared in the presence of a catalyst mainly containing organic sodium compounds in a polymerization inert solvent and the obtained polymerization mixture is then combined with a certain quantity of an aqueous solution of isopropyl alcohol at a certain concentration. The catalyst component in the polymerization mixture is decomposed and the catalyst residue is transferred into the aqueous solution of isopropyl alcohol. Therefore, the liquid low molecular weight polymers containing substantially no catalyst residue can be obtained.

(2) Description of Prior Art

Liquid low molecular weight polymers that are prepared by polymerizing or copolymerizing conjugated dienes such as butadiene and isoprene, have many unsaturated bonds in their molecules, so that they are widely used for producing thermosetting resins, drying oils, sealing materials, water-soluble coating materials, electrodeposition coating materials, electric insulators, rubber modifiers and various kinds of reactive intermediates. Accordingly, it is desirable that the liquid low molecular weight polymers of conjugated dienes as raw materials do not contain catalyst residues at all because undesirable influences in secondary chemical reactions and lowering of the properties of final products occur when the catalyst residue is contained.

It is well known in the art that a liquid low molecular weight polymer is prepared by polymerizing or copolymerizing butadiene or butadiene and another monomer in the presence of alkali metal or its organic compound such as alkyl sodium. (For example, U.S. Pat. No. 3,789,090).

The liquid polymerization mixture obtained from the above reaction contains the alkali metal or its organic compound in dispersed state or dissolved state. Several methods have been proposed to decompose and remove catalyst components out of the polymer.

In the method described in U.S. Pat. No. 2,813,136, a large quantity of hot water is added to a liquid polymerization mixture to decompose and separate catalyst. With this method, however, the catalyst residue cannot be completely removed since an indestructible emulsion is formed. In a method to avoid the formation of emulsion disclosed in Japanese Patent Publication No. 4098 of 1958, the polymerization product is treated with clay containing 1 to 25% of bound water and the resultant mixture is subjected to percolation or filtration. In the method disclosed in Japanese Patent Publication No. 7942 of 1956, hydrogensulfate is produced by using concentrated sulfuric acid and it is then filtered off. In both the methods, it is necessary to remove very fine and considerable quantity of decomposition products of catalysts by means of filtration or centrifugal separation. However, the filter medium is liable to be blocked when a filter is used and in the case of centrifugal separation, continuous operation is difficult. Accordingly, the conventional methods are disadvantageous in that the complete removal of catalyst residue is hard to attain and the loss of obtained polymer is not negligible.

As described above, it is very difficult to decompose the catalyst and to remove it from the polymer solution simultaneously in a single step. In the method disclosed in Japanese Patent Publications, No. 12306 of 1965 and No. 17914 of 1965, the polymer solution is treated with a small quantity of water or dilute acid to form solid decomposition product of catalyst and it is separated by filtration or centrifugal separation in the first step, and in the second step, the separated polymer solution is brought into contact with clay or acid clay so as to remove the remaining decomposition product of catalyst. The decomposition product of catalyst formed in the first step is, however, very fine and sticky so that the filtration is very difficult and the filterable volume per unit area of filter medium is small since the filter medium is liable to be blocked in a short time. Further, in the centrifugal separation, it is also disadvantageous in that continuous treatment is impossible. In addition, the loss of polymer cannot be avoided in both the filtration and centrifugal separation.

In the method disclosed in Japanese Patent Publication No. 40866 of 1972, the catalyst is decomposed and simultaneously separated by adding 4 to 10-fold molar quantity of methanol to the catalyst of alkali metal or its organic compound in the first step and the lower methanol phase containing most of the catalyst residue is then separated and removed. The upper polymer liquid phase is then treated with an absorbent such as clay or alumina to eliminate the contained catalyst residue by adsorption. Since most of the catalyst is separated by decomposing and liquefying the catalyst, the first step of this method is somewhat advantageous as compared with the method of Japanese Patent Publications, No. 12306 of 1965 and No. 17914 of 1965, however, solid industrial waste is produced in the filtration or centrifugal separation after the adsorption of catalyst residue with clay or the like in the second step and this step is accompanied by the loss of obtained polymer. Accordingly, the defect of this method is substantially the same as that of the foregoing method, and this method cannot be either adopted in industrial production.

BRIEF SUMMARY OF THE INVENTION

As a result of eager and extensive studies to improve the well known methods, the inventors of the present application have found a novel and superior method to recover liquid low molecular weight polymer of conjugated dienes containing no catalyst residue from a liquid polymerization mixture containing a catalyst of organic sodium compound.

It is therefore the object of the present invention is to provide an improved industrial method for recovering liquid low molecular weight polymer.

Another object of the present invention is to provide a method for recovering liquid low molecular weight polymer that is accompanied by neither the loss of the polymer nor the formation of industrial waste.

A further object of the present invention is to provide a method for recovering liquid polymer which does not contain any residual catalyst component.

Still a further object of the present invention is to provide a method for recovering liquid polymer of conjugated diolefins which can be carried out easily and economically.

In accordance with the method of the present invention, a conjugated diolefin or comonomers of conjugated diolefins and a vinyl compound having anionic polymerization activity are polymerized or copolymerized in the presence of a catalyst containing an organic sodium compound as a main component and a chain transfer agent of an alkyl aryl compound. The above organic sodium compound is represented by the general formula:

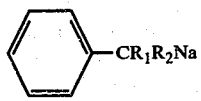

in which each of $R_1$ and $R_2$ is a hydrogen atom or an alkyl group. Further, the alkyl aryl compound used in the above reaction is represented by the general formula:

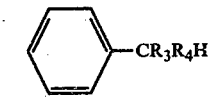

in which each of $R_3$ and $R_4$ is a hydrogen atom or an alkyl group. Then, 50-200 parts, preferably 70-150 parts, by volume of isopropyl alcohol aqueous solution of 10-60%, preferably 25-45%, by weight is added with stirring to 100 parts by volume of the polymerization mixture containing the liquid low molecular weight polymer so as to decompose the catalyst and to transfer the residual catalyst component into the layer of isopropyl alcohol aqueous solution. All the catalyst can be thus separated from the polymerization mixture containing the liquid low molecular weight polymer and thereby recovering the polymer containing none of remaining catalyst at all.

Further, in accordance with the method of the present invention, the low molecular weight polymer can be recovered from the polymerization mixture of conjugated diolefin containing the catalyst of an organic sodium compound without the formation of any industrial waste and the loss of produced polymer.

Since the solid industrial waste is not produced and the loss of polymer is prevented in the method of the present invention, the economical and work efficiencies can be much improved as compared with the conventional methods. The surprising fact is that the separation of catalyst by the decomposition and transferring of the catalyst can be quite easily attained only by uniformly mixing a certain quantity of isopropyl alcohol aqueous solution at a certain concentration into the polymerization mixture. That is, when methyl alcohol, ethyl alcohol, n-propyl alcohol or tert-butyl alcohol is used in place of isopropyl alcohol, the transferring of catalyst residue into the alcohol-water phase and the separation of phases is not good even though the catalyst is decomposed so that the same effect as that in the use of isopropyl alcohl aqeuous solution cannot be expected. This fact has never been anticipated.

DETAILED DESCRIPTION OF THE INVENTION

The catalysts of organic sodium compounds used in the method of the present invention, are represented by the general formula:

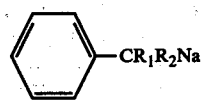

in which each of $R_1$ and $R_2$ is a hydrogen atom or an alkyl group. These compounds can be easily synthesized through the transmetalation between an alkyl aryl compound represented by the general formula:

in which each of R and R' is a hydrogen atom or an alkyl group, and an organic sodium compound represented by the general formula:

R"—Na in which R" is an alkyl group or a phenyl group. (Exemplified in, for example, I. E. C., 46, (3), 539 (1954)).

Exemplified as the liquid low molecular weight polymers of the present invention are homopolymers of conjugated diolefins such as butadiene, 2,3-dimethyl-1,3-butadiene, isoprene and piperylene, and copolymers of two or more conjugated diolefins and one or more vinyl monomers having anionic polymerization activity, where the copolymers containing 50% or less comonomer components are included.

The mono-vinyl monomers having anionic polymerization activity used in the present invention are exemplified by styrene, several alkyl-substituted styrenes such as α-methylstyrene, vinylnaphthalene, and acrylic acid and its esters having acrylic substituent groups.

The liquid low molecular weight polymers referred to in the present invention are those which are liquid or viscous semisolid at normal condition and have number average molecular weights in the range of 300 to 10,000.

The hydrocarbon solvents preferably used in the present invention that are inert to polymerization are exemplified by benzene or aliphatic hydrocarbons such as n-butane, n-pentane, n-hexane, n-heptane and n-octane, or relatively low boiling hydrocarbons such as cyclohexane. Alkyl aryl hydrocarbons are generally not preferable since they act as chain transfer agents. When a high boiling hydrocarbon is used, it becomes difficult to separate the solvent from the polymer because the fractional separation is hard to be performed owing to the higher boiling point thereof, which results in disadvantage in industrial production.

In the present invention, a certain quantity of alkyl aryl compound is used as a chain transfer agent, and the alkyl aryl compound is represented by the general formula:

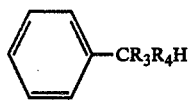

in which each of $R_3$ and $R_4$ is a hydrogen atom or an alkyl group. The compounds preferably used are exemplified by toluene, xylene, ethylbenzene, cumene, mesitylene and durene. Compounds having polar groups of halogen, nitrile or hydroxyl groups are not desirable since they react with the catalyst.

The polymerization of conjugated dienes can be carried out at a temperature in the wide range of −80° to 100° C. When the polymerization temperature is too low, the polymerization rate becomes low, which is industrially disadvantageous. While, if the polymerization temperature is too high, the obtained polymer suffer from the defect that it is colored. The polymerization temperature may be therefore in the range of 0° to 80° C. Further, the polymerization can be performed either continuously or batchwise.

The isopropyl alcohol aqueous solution herein referred to is an aqueous solution containing 10 to 60% by weight of isopropyl alcohol. The water used for diluting isopropyl alcohol may be city water, deionized water, distilled water, dilute acid solution or dilute alkaline solution. The acids used for the dilute acid slution are preferably mineral acids such as phosphoric acid, sulfuric acid, hydrochloric acid and nitric acid and the quantity of the acid is less than the total moles of the organic alkali metal compounds and alkali metals contained in the polymerization mixture. When the quantity of acid exceeds the total moles, the residual acid after the decomposition and neutralization of catalyst causes the corrosion of apparatus in the process of solvent removal from the polymer, and the polymer is also impaired. Exemplified as the alkalis used for preparing the dilute alkaline solution are sodium hydroxide, potassium hydroxide and sodium hydrogencarbonate. The quantity of the alkali may be 0.5% by weight or less, and preferably not more than 0.01% by weight.

The quantity of isopropyl alcohol aqueous solution used in the present invention may be 50 to 200 parts by volume, preferably 70 to 150 parts by volume, to 100 parts by volume of the polymerization mixture obtained through the above-described polymerization process. If the concentration of isopropyl alcohol in the above isopropyl alcohol aqueous solution is less than 10% by weight, an indestructible emulsion is formed even when 50 to 200 parts by volume of the solution is used, so that the separation of phases cannot be attained. On the other hand, when the isopropyl alcohol aqueous solution of more than 60% by weight in concentration is used and 50 to 200 parts by volume to 100 parts by volume of the polymerization mixture, the two liquid phases cannot be separated since the polymer separates out of the polymerization mixture, and the complete transfer of the catalyst residue into the isopropyl alcohol aqueous solution cannot be accomplished. Further, when the quantity of the isopropyl alcohol aqueous solution is less than 50 parts by volume to 100 parts by volume of the polymerization mixture, some catalyst remains in the polymerization mixture or it is emulsified, therefore the two phases cannot be separated. When more than 200 parts by volume of isopropyl alcohol aqueous solution is used, separation of polymer is caused to occur so that the separation of two liquid phases becomes troublesome and complicated, in addition, it is disadvantageous in view of the cost to use a large quantity of isopropyl alcohol.

The present invention is applicable to the polymerization mixture just after polymerization containing the catalyst in active state, and also to the polymerization mixture in which the catalyst has been decomposed by adding 1 to 30-fold moles of isopropyl alcohol and the isopropyl alcohol aqueous solution of the invention, to the total moles of the organic alkali metal compound and the alkali metal.

The polymerization mixture of the present invention is the solution containing not more than 35% by weight, preferably not more than 25% by weight, of polymer. When the concentration of the polymer exceeds 35% by weight, it is desirable that the polymerization inert solvent used in the polymerization process may be added to dilute the polymerization mixture. In this case, the quantity of the isopropyl alcohol aqueous solution must be determined on the basis of the diluted polymerization mixture.

The temperature at which the polymerization mixture is uniformly mixed with the isopropyl alcohol aqueous solution, and simultaneously the catalyst is decomposed and the catalyst residue is transferred into the isopropyl alcohol solution, is not especially restricted. It is, however, desirable that the above process is carried out at a temperature of 0° to 80° C., preferably 0° to 50° C.

The uniform mixing of the polymerization mixture and the isopropyl alcohol aqueous solution can be performed both batchwise and by using a line mixer.

As described above, when the polymerization mixture of conjugated diene low molecular weight polymer is mixed with the isopropyl alcohol aqueous solution, a fragile, or unstable emulsion is formed, and when it is left to stand still after the mixing, it separates into two phases of the polymerization mixture and the isopropyl alcohol aqueous solution within several minutes to several hours. All the catalyst residue is extracted into the isopropyl alcohol aqueous solution and it does not remain at all in the polymerization mixture. In the present invention, the separation of the polymerization mixture may be carried out by both batchwise settling and continuous separation.

The treated polymerization mixture obtained through the above separation step is then subjected to conventional solvent removal process, in which the solvent, water and isopropyl alcohol are distilled away to obtain a refined low molecular weight polymer of conjugated diene containing no catalyst residue.

In order that those skilled in the art may better understand the present invention and the manner in which it may be practised, the following specific examples are given. It should be noted, however, that these are only illustrative and by no means restrictive of the invention.

EXAMPLES 1-4 and

COMPARATIVE EXAMPLES 1-5

According to the conventional method, 22.4 g of chlorobenzene was added to the system consisting of 10.1 g of metallic sodium dispersoid, 202.6 g of toluene and 100 g of benzene to prepare a catalyst liquid containing 0.2 mole of benzyl sodium.

An autoclave of 5 lit. capacity equipped with an inner coil, a jacket and a stirrer was fully subjected to nitrogen replacement and all the above catalyst liquid was fed into this autoclave. Further, 2300 g of benzene was fed and then polymerization was carried out by adding 1080 g of butadiene at a constant rate for 4.5 hours at a liquid temperature of 30° C.

After 4.5 hours, 100 parts by volume of the above obtained polymerization mixture and 100 parts by volume of each shortstop shown in the following Table 1 were fed into a 2 lit., round bottom, cylindrical and glass made separable flask and the contents were uniformly mixed together for 30 minutes. After this mixing, the mixture was allowed to stand for a further 30 minutes. Then, the state of each phase and the alkalinity of the polymerization mixture phase were tested.

EXAMPLES 4-6 and COMPARATIVE EXAMPLES 6-9

According to the conventional method, a catalyst liquid containing 0.2 mole of benzyl sodium was prepared by adding 22.4 g of chlorobenzene to a system comprising 10.1 g of metallic sodium dispersoid, 73.7 g of toluene and 100 g of benzene. All of this mixture was fed into a 5 lit. autoclave and 2430 g of benzene was further added. Maintaining the contents at 30° C., 1080 g of butadiene was fed into the autoclave at a constant rate for 4.5 hours to obtain a polymerization mixture. To 100 parts by volume of the polymerization mixture

TABLE 1
ALKALI REMOVING EFFECT OF SHORTSTOP SOLUTIONS

| | | | | State after 30 Min. of Standing | | | | |
| | | Shortstop Solutions | | Separability | | | NaOH(wt. ppm) | |
| Example | No. | Kind | Conc. (wt %) | Upper Layer | Middle Layer | Lower Layer | Upper Layer | Middle Layer |
| --- | --- | --- | --- | --- | --- | --- | --- | --- |
| Example | 1 | Isopropyl alcohol-water | 20 | Slightly turbid | None | Transparent | 0.1 or less | — |
| " | 2 | " | 30 | " | " | " | 0.1 or less | — |
| " | 3 | " | 40 | " | " | " | 0 | — |
| Comp. Example | 1 | Methyl alcohol-water | 40 | Very cloudy | " | " | 30 | — |
| " | 2 | Ethyl alcohol-water | 40 | " | " | " | 20 | — |
| " | 3 | n-Propyl alcohol-water | 40 | Slightly turbid | " | " | 20 | 5 |
| " | 4 | tert-Butyl alcohol-water | 40 | Transparent | Transparent | " | 20 | 5 |
| " | 5 | Acetone-water | 40 | Very Cloudy | None | " | 500 | — |

As shown in Table 1, when the aqueous solution of methyl alcohol, ethyl alcohol, n-propyl alcohol, tert-butyl alcohol or acetone other than isopropyl alcohol is used, it became apparent that all the catalyst residue cannot be tranferred into the aqueous solution of hydrophilic solvent even though the catalyst is deactivated. Thus, the striking aspect of the present result is that only the isopropyl alcohol aqueous solution is particularly effective for the extraction of catalyst residue and the phase separation of the polymerization mixture.

were added 50 parts by volume of benzene and 4 parts by volume of isopropyl alcohol so as to stop the polymerization. The thus prepared polymer mixture "A" was combined with isopropyl alcohol aqueous solutions "B" of various concentrations and quantities. The mixtures were then uniformly mixed for 30 minutes and allowed to stand for further 30 minutes. After this treatment, the states of the mixtures and the alkalinities of the polymerization mixture phases were tested, the results of which are shown in the following Table 2.

TABLE 2
EXTRACTION OF ALKALI WITH ISOPROPYL ALCOHOL AQ. SOLN.

| | | Isopropyl Alcohol Conc. of Soln. "B" (wt %) | Volume Ratio of Soln. "B" to 100 Parts of Mixture "A" | State after 30 Min. of Standing | | | | |
| | | | | Separability | | | NaOH (wt. ppm) | |
| Example | No. | | | Upper Layer | Middle Layer | Lower Layer | Upper Layer | Middle Layer |
| --- | --- | --- | --- | --- | --- | --- | --- | --- |
| Example | 4 | 50 | 100 | Slightly turbid | Transparent | Transparent | 0 | 0 |
| " | 5 | 25 | 70 | Slightly turbid | — | Transparent | 0 | — |
| " | 6 | 40 | 150 | Slightly turbid | Transparent | Transparent | 0 | 0 |
| Comp. Example | 6 | 75 | 100 | Slightly turbid | Transparent Polymer separated out | Transparent | 10 | 5 |
| " | 7 | 8 | 100 | Cloudy | — | Cloudy | 20 | — |
| " | 8 | 40 | 250 | Slightly turbid | Transparent | Transparent | 2 | 2 |
| " | 9 | 40 | 40 | Cloudy | — | Transparent | 30 | — |

In these Examples, the viscosity of the polymerization mixture was 3 cp at 25° C. and the concentration of polymer was 29% by weight. The polymerization solvent was removed from the treated polymerization mixture to obtain a polymer, which was a colorless transparent liquid of 1150 in number average molecular weight and 25 poise in viscosity of 25° C.

As clearly understood from Table 2, when the concentration of the isopropyl alcohol aqueous solution and the mixing ratio of it relative to the polymer mixture do not come within the specified range of the present invention, the polymer is separated out and sodium hydroxide remains in the polymer mixture.

In these Examples, the viscosity of the polymerization mixture was 20 cp at 25° C. and the concentration of polymer was 30% by weight. By removing the polymerization solvent from the treated polymerization mixture, the polymer of colorless transparent liquid having a number average molecular weight of 2500 and a viscosity of 300 poise at 25° C. was obtained.

EXAMPLE 7

A catalyst liquid containing 0.2 mole of

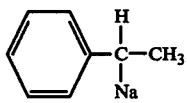

was prepared according to the conventional method by adding 22.4 g of chlorobenzene to the system comprising 10.1 g of metallic sodium and 300 g of ethylbenzene. All of this catalyst liquid was fed into a 5 lit. autoclave with a stirrer, and then 1900 g of ethylbenzene and 40 g of benzene was added thereto. Polymerization was carried out by adding 1350 g of isoprene at a constant rate for 4.5 hours at 40° C. 1000 ml of the thus obtained polymerization mixture was then fed into a 4 lit., round bottom, cylindrical, separable flask and it was diluted with 500 ml of n-hexane, at the same time, 50 ml of 35 wt% isopropyl alcohol aqueous solution was added to decompose the catalyst. Then, 1450 ml of the isopropyl alcohol aqueous solution was further added and uniformly mixed together for 30 minutes with stirring. After the stirring was stopped, the mixture was allowed to stand still, where the mixture separated into two phases of a polymer mixture containing substantially no sodium hydroxide and an isopropyl alcohol aqueous solution.

The viscosities of the polymerization mixture and diluted polymer mixture were 40 cp and 25 cp at 25° C., respectively, and the concentrations of polymer were about 34% and about 23% by weight, respectively. The obtained polymer solution was then subjected to solvent removal of reduced pressure distillation at 1 mmHg and 150° C. The properties of the obtained liquid low molecular weight polymer of isoprene were 2400 in number average molecular weight and 800 poise in viscosity at 25° C.

EXAMPLE 8

With the same polymerization vessel and the same catalyst liquid as those of Example 1, 1200 g of equimolar mixture of styrene and butadiene was polymerized at 30° C. by feeding it into the vessel continuously for 4.5 hours. The thus obtained polymerization mixture and 40 wt% isopropyl alcohol aqueous solution in the volume ratio of 100:120 were mixed uniformly for 30 minutes. After the mixing, the mixture was allowed to stand still for 30 minutes, and sodium hydroxide in the separated polymer containing phase was tested, however, it was not detected.

What is claimed is:

1. In a method for obtaining a liquid low molecular weight polymer containing no catalyst residue, which method comprises the steps of:
polymerizing a conjugated diolefin or copolymerizing comonomers of conjugated diolefins and a vinyl compound having anionic polymerization activity which is at least one member selected from the group consisting of styrene, alkyl-substituted styrenes, and vinyl napthalene, in the presence of a polymerization catalyst mainly containing an organic sodium compound represented by the general formula:

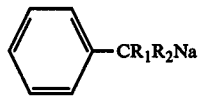

in which each of $R_1$ and $R_2$ is a hydrogen atom or an alkyl group, and a chain transfer agent of an alkyl aryl compound represented by the general formula:

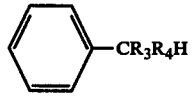

in which each of $R_3$ and $R_4$ is a hydrogen atom or an alkyl group to obtain a polymerization mixture; and thereafter recovering said liquid low molecular weight polymer, the improvement which comprises effecting said recovery by:
uniformly mixing 100 parts by volume of said polymerization mixture with 50 to 200 parts by volume of an agent which consists essentially of an isopropyl alcohol aqueous solution of 10 to 60% by weight in concentration;
separating thus formed mixture into two phases of a polymer mixture containing said liquid low molecular weight polymer and an isopropyl alcohol aqueous solution containing catalyst residue; and
separating said liquid low molecular weight polymer from said polymer mixture.

2. A method for recovering a liquid low molecular weight polymer as claimed in claim 1, wherein said low molecular weight polymer is a liquid or viscous semi-solid polymer having a number average molecular weight in the range of 300 to 10,000.

3. A method for recovering a liquid low molecular weight polymer as claimed in claim 1, wherein said conjugated diolefin is at least one member selected from the group consisting of butadiene, 2,3-dimethyl-1,3-butadiene, isoprene and piperylene.

4. A method for recovering a liquid low molecular weight polymer as claimed in claim 1, wherein said alkyl aryl compound is at least one member selected from the group consisting of toluene, xylene, ethylbenzene, cumene, mesitylene and durene.

5. A method for recovering a liquid low molecular weight polymer as claimed in claim 1, wherein the quantity of said isopropyl alcohol aqueous solution to 100 parts by volume of said polymerization mixture is 70 to 150 parts by volume and the concentration of said isopropyl alcohol aqueous solution is 25 to 45% by weight.

6. A method for recovering a liquid low molecular weight polymer as claimed in claim 1, wherein the concentration of said polymer in said polymerization mixture is not more than 35% by weight.

7. A method for recovering a liquid low molecular weight polymer as claimed in claim 6, wherein said concentration is not more than 25% by weight.

* * * * *